United States Patent
Mullendore et al.

(10) Patent No.: US 8,051,197 B2
(45) Date of Patent: Nov. 1, 2011

(54) NETWORK CONGESTION MANAGEMENT SYSTEMS AND METHODS

(75) Inventors: Rodney N. Mullendore, San Jose, CA (US); Aamer Latif, Milpitas, CA (US); Joseph L. White, San Bruno, CA (US); Englin Koay, Fremont, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 2754 days.

(21) Appl. No.: 10/393,957

(22) Filed: Mar. 20, 2003

(65) Prior Publication Data

US 2003/0185154 A1    Oct. 2, 2003

Related U.S. Application Data

(60) Provisional application No. 60/368,582, filed on Mar. 29, 2002.

(51) Int. Cl.
*G06F 15/16* (2006.01)
(52) U.S. Cl. ............... 709/234; 709/232; 370/235
(58) Field of Classification Search ........... 709/213, 709/201, 202, 217, 234; 370/235, 230
See application file for complete search history.

(56) References Cited

U.S. PATENT DOCUMENTS

| | | |
|---|---|---|
| 5,592,622 A | 1/1997 | Isfeld et al. |
| 5,805,805 A | 9/1998 | Civanlar et al. |
| 5,894,481 A | 4/1999 | Book |
| 5,905,873 A | 5/1999 | Hartmann et al. |
| 5,996,024 A | 11/1999 | Blumenau |
| 6,000,020 A | 12/1999 | Chin et al. |
| 6,006,291 A | 12/1999 | Rasmussen et al. |
| 6,021,454 A | 2/2000 | Gibson |
| 6,049,833 A | 4/2000 | Chan et al. |
| 6,148,414 A | 11/2000 | Brown et al. |
| 6,356,944 B1 * | 3/2002 | McCarty ............ 709/222 |
| 6,400,730 B1 | 6/2002 | Latif et al. |
| 6,606,690 B2 * | 8/2003 | Padovano ........... 711/148 |

(Continued)

FOREIGN PATENT DOCUMENTS

WO    WO 98/36537 A1    8/1998

(Continued)

OTHER PUBLICATIONS

European Patent Office, Supplementary Partial European Search Report (EPO Form 1503) for European Patent Application No. 03716938, Jul. 13, 2007, 4 pages.

*Primary Examiner* — John Follansbee
*Assistant Examiner* — Dhairya A Patel
(74) *Attorney, Agent, or Firm* — Wong, Cabello, Lutsch, Rutherford & Brucceleri LLP

(57) ABSTRACT

Systems, methods and software useful for overcoming network congestion problems including head-of-line blocking issues and other network congestion problems. In certain aspects, flow control mechanisms implemented in a switch device or other network device manage buffer and system level resources using a scheduler to control the amount of data requested from a local SAN fabric. Switches and other network devices configured according to the present invention monitor each individual SCSI task, and are configured to apply flow control measures to each active session when buffering resources become scarce, such as when buffering data for a slower-speed WAN link or TCP/IP based interconnects of any speed.

29 Claims, 14 Drawing Sheets

U.S. PATENT DOCUMENTS

| | | | |
|---|---|---|---|
| 6,683,883 B1 * | 1/2004 | Czeiger et al. | 370/401 |
| 7,185,062 B2 * | 2/2007 | Lolayekar et al. | 709/213 |
| 2001/0016878 A1 | 8/2001 | Yamanaka | |
| 2001/0037406 A1 | 11/2001 | Philbrick et al. | |
| 2001/0049740 A1 | 12/2001 | Karpoff | |
| 2002/0031090 A1 | 3/2002 | Kadambi et al. | |

FOREIGN PATENT DOCUMENTS

| | | |
|---|---|---|
| WO | 0042741 | 7/2000 |
| WO | WO 00/42741 | 7/2000 |

* cited by examiner

FC/Ethernet Port Configuration - 192.168.1.237                                  [x]

| | |
|---|---|
| Port number: | 7 ▼ |
| Operational state: | Up |
| Multi-function port type: | Gigabit Ethernet ▼ |
| Port name: | Port 7 |
| Port Speed (1500..1000000 Kbps): | 1000000 |

☑ Enable Port  ☐ Flash LED  ☑ Autonegotiations (Full duplex only)

GE Port Parameters

Port type:  ○ Layer 2  ○ Layer 2 with iSCSI / iFCP
            ○ Layer 3  ⦿ Layer 3 with iSCSI / iFCP iSCSI / iFCP Parameters

☑ Auto-reset port on severe errors  ☑ iSCSI  ☑ iFCP
☑ Optimize WAN throughput

| | Current configuration | Active on next reset |
|---|---|---|
| IP address: | 192.168.129.130 | 192 . 168 . 129 . 130 |
| Subnet mask: | 255.255.255.240 | 255 . 255 . 255 . 240 |
| External router address: | 192.168.129.129 | 192 . 168 . 129 . 129 |
| Internal SAN address: | 192.168.129.82 | 192 . 168 . 129 . 82 |
| MAC address: | 00:01:0F:00:53:2F | |
| Unicast routing protocol: | None | |
| Multicast routing protocol: | DVMRP | [Reset Port] |

[OK]  [Apply]  [Cancel]  [Help]

FIG. 8

NETWORK CONGESTION MANAGEMENT SYSTEMS AND METHODS

CROSS-REFERENCES TO RELATED APPLICATIONS

This application claims the benefit of U.S. Provisional Application Ser. No. 60/368,582, filed Mar. 29, 2002, the contents of which are hereby incorporated by reference for all purposes.

BACKGROUND OF THE INVENTION

The present invention relates generally to computer networks, and more particularly to traffic congestion management in networks.

Congestion issues are common in networks, and particularly storage networks, due to the large data flows that they must support. In Fiber Channel networks, for example, congestion is typically managed through the use of link-based flow control mechanisms. Since there is no end-to-end flow control, head-of-line blocking of storage traffic is a common, anticipated phenomenon. Because the size of a typical Fiber Channel network is small in comparison to typical IP (Internet Protocol) networks, the impact and consequences of congestion and head-of-line blocking is limited and usually considered of minor significance.

However, with the introduction of iSCSI and iFCP technologies come the potential to significantly scale the size of storage networks. Rather than the 3-4 switches typical of storage networks in the past, iSCSI and iFCP allow practically unlimited scaling in the size of storage networks. In a large IP storage network consisting of hundreds of switches, a congestion issue has the potential to negatively impact the performance and reliability of a greater number of storage devices.

In addition, the use of IP introduces a greater number of link-level transports available to carry storage data, including, for example, Gigabit Ethernet, SONET, ATM, PPP, and DWDM. With the increase in types of physical transports come a much wider range of link speeds at which storage data is carried, leading to potential mismatches that may compound the impact of congestion issues. In particular, congestion caused by a relatively slow link such as a T-1 or T-3 link can cause rippling effects on the efficiency and utilization of adjacent gigabit-speed links, even if the low-speed link is rarely utilized.

Head-of-line blocking is an issue for any network technology that exclusively uses link-based flow control mechanisms to manage congestion for session-based network traffic. This allows for the effects of link-based flow control mechanisms, when triggered, to potentially impact sessions that are neither utilizing the congested link nor contributing to the congestion in any way.

FIG. 1 illustrates a basic example of head-of-line blocking in a network. As is shown, sessions to device C from devices A and D causes congestion in switch 10 when devices A and D attempt to send data at a rate which is higher than device C is able to receive. Assume that the links between the switch and each device shown in FIG. 1 are capable of carrying 1 Gbps (Gigabits per second) of data. Assume that devices A and D are attempting to each send 600 Mbps (megabits per second) of data to Device C. Switch 10 will be forced to buffer up some of the data since it will be receiving 1200 Mbps of data from devices A and D but can only forward data at a rate of 1000 Mbps to device C. Thus, switch 10 will be accumulating data until its internal buffering is exhausted when the link-level flow control mechanism between switch 10 and devices A and D will be invoked to slow the combined data rate to 1000 Mbps. Link-level flow control thus prevents the internal buffer of switch 10 from being overflowed, thereby preventing loss of data within the network. Assuming the ports are treated fairly, device A and D will each be limited to a 500 Mbps data rate. However, the link-level flow control mechanisms have no intelligence on which sessions (i.e., those directed to device C) are causing the flow control/congestion problem. Thus, other traffic that is not involved with the congestion, such as traffic from device A to device B, is affected by the link-level flow control.

All Fiber Channel fabrics rely exclusively on the Fiber Channel link-level buffer-to buffer credit mechanism, and are thus susceptible to head-of-line blocking issues. Until recently, Fiber Channel links were exclusively 1.0625 Gbps in throughput, and the uniformity in high-speed link throughput limited the occurrence of head-of-line blocking to those situations involving multiple session streams.

Internet Protocol (IP) can be used to internetwork many link-level networking protocols, each characterized by different link speeds. For example, IP allows ethernet networks to be internetworked with other protocols such as ATM, Token Ring, SONET, PPP, etc . . . IP is "link-neutral", meaning it doesn't care what link technology is used. Due to the heterogeneity of IP transports, an end-to-end flow control mechanism such as Transmission Control Protocol (TCP) is recommended, and a heavy reliance on link-level flow control is recognized as having unintended side-effects.

The introduction of IP-based transports for connecting Fiber Channel devices or interconnecting Fiber Channel networks introduces serious congestion management issues. For example, since Class 3 Fiber Channel does not have an end-to-end flow control mechanism, it must rely on link-level flow control to manage congestion and reduce packet loss. Unfortunately, this potentially raises serious head-of-line blocking issues when used with IP, since many link-level technologies used for IP are relatively slow in their link throughput compared to native Fiber Channel. Unless an end-to-end flow control mechanism is introduced, a single storage session can result in serious head-of-line blocking effects that may affect traffic in the local fabric.

FIG. 2 illustrates the head-of-line blocking phenomenon as a result of a slow WAN link. Storage traffic simply backs up when it must ingress a slow-speed WAN link. For example, the introduction of slow speed IP links, such as T1 (1.544 Mbps), can have rippling effects on congestion. As shown in FIG. 2, for example, a storage session from Device A to Device D is encapsulated in IP datagrams for transmission over a slower WAN link 20. Switch #2 receives data at a faster rate than it can send over WAN link 20, and thus initiates flow control to the upstream Switch #1. Doing so, however, affects other non-related traffic that flows across the inter-switch link (ISL) between Switch #1 and Switch #2, such as traffic from Device B to Device C, which competes with the WAN session traffic for available bandwidth on the ISL. Thus, the triggered link-level flow control not only impacts traffic destined for WAN link 20, but also the local high speed traffic from device B to device C. Instead, traffic from Device B to Device C will most likely have a similar throughput as that achieved over the slower WAN link 20.

Congestion caused by head-of-line blocking may also result when Storage Networks using link level flow control are connected using high speed links such as Gigabit Ethernet or 10 Gigabit Ethernet when the protocol used on the high speed links is TCP/IP. TCP (Transmission Control Protocol) includes congestion control mechanisms as part of the protocol which dynamically change the rate at which data may be transmitted. Therefore, a high speed link connected to an IP network using TCP may operate at a relatively low speed depending on the characteristics of the IP network. The data rates which can be transmitted can vary widely from the full link bandwidth (e.g. 1 Gbps or 10 Gbps) down to a few Kbps (kilobits per second).

FIG. 13 shows a SAN 300 which uses an IP network 310 to interconnect Local SAN A 360, Local SAN B 365 and an initiator system or device 350 which uses iSCSI as a storage protocol. The various devices in each of the local SANs are interconnected with a link level flow control based network such as Fiber Channel. The protocols used to interconnect the local SANs to the IP network 310 may be any TCP/IP based storage protocol such as, for example, iFCP, FCIP and iSCSI. The same congestion problems which can occur when 2 local SAN networks are interconnected with a slow speed WAN link can also occur in the SAN 300 shown in FIG. 13 because the high speed links connecting switches B and C to the IP network 310 may have only a fraction of their bandwidth utilized. The usable bandwidth on the high speed links may be limited by the TCP/IP protocol which reduces the bandwidth used when it detects frames being discarded in the IP network. The used bandwidth will gradually be increased until frames are once again dropped. However, the recovery from dropped frames by TCP often results in no data being transmitted for periods of 1 or more seconds.

The introduction of data links that have a high latency, such as IP-based WAN links, can result in a significant degradation in write performance. Read performance can also be negatively impacted but typically to a lesser extent than write performance. The drop in performance is typically due to handshaking within the protocol used to carry the SCSI commands. FIG. 9 shows an example of a SCSI read command using FCP (Fiber Channel Protocol) in a low latency network. In this example, an initiator 335 issues a read command (FCP_CMD) to a target device 345 requesting that the target return a specific group of data. The target returns the requested data in (FCP_DATA) packets on the network followed by the command status (e.g., in an FCP_RSP frame). In a low latency network, the time required for the read command to complete is dominated by the time required by the target to process the command, retrieve the requested data from memory media (e.g., disk drives, magnetic tape, etc.) and transmit the data and status in packets to the initiator. The addition of latency in the network increases the time required to complete a read command by the total round trip time (RT) of the network (a network with a latency of 5 ms in each direction has an RT of 10 ms). FIG. 10 shows how the read command is affected by network latency in a high latency network. The time required for the read command to complete is increased by RT. For example, if a read command would normally complete in 10 ms (milliseconds) in a network with no latency, the same command would require 60 ms to complete in a network with 50 ms of latency.

FIG. 11 shows an example of a SCSI write command performed using FCP in a low latency network. The initiator 335 issues the write command request (FCP_CMD). The target 345 receives the write command and returns an FCP_XFER_RDY frame when it is ready to accept the data for the write command. The target indicates in the FCP_XFER_RDY frame the amount of the command write data it is requesting from the initiator. The target may request any amount of the data. The initiator sends the requested data to the target in FCP_DATA frames. When the target receives all of the requested data, it either requests additional data by issuing another FCP_XFER_RDY frame if all of the data has not yet been received or returns the SCSI status in an FCP_RSP frame completing the SCSI command. For example, if the initiator issued a 256 KB (kilobyte) write command, the target could return a XFER_RDY frame requesting 64 KB of the data. When this data was transferred, the target could request another 64 KB, then another 64 KB until all of the data was transferred. When all of the data has been transferred, the target would reply with an FCP_RSP frame indicating the status for the SCSI command. Alternatively, the target could have issued a single request for 256 KB of data or for any combination of requests which summed to 256 KB. Note that the target can not issue another request for data until it has received the data from an earlier data request.

FIG. 12 shows the effect of performing write commands over a network with high latency. The network latency has a greater effect on the time required to complete write commands than for read commands due to the additional handshakes between the initiator 335 and target 345. The write command completion time will be delayed an additional N*RT where N=the number of FCP_XFER_RDY+1 issued by the target. For example, assume a write command would complete in 10 ms in a network with no latency. The same command on a network with a 50 ms RT would require 110 ms to complete if the target issues a single FCP_XFER_RDY frame. The required time could be much higher if the target issues multiple FCP_XFER_RDY frames. For example, if the target issued 4 XFER_RDY frames, the delay would increase to 260 ms.

It is therefore desirable to provide congestion management systems, methods and software that avoid or significantly reduce the effects of head-of-line blocking and network latency. Such technologies should allow for the full and efficient utilization of slow-speed and/or high latency links within a network, e.g., storage area network (SAN), without impacting the performance of upstream high-speed links.

BRIEF SUMMARY OF THE INVENTION

The present invention provides systems, methods and software useful for overcoming network congestion problems including head-of-line blocking issues and other network congestion problems. In certain aspects, the present invention is particularly applicable for use with any networked transport mechanisms used to carry SCSI operations between SCSI initiator and target devices, including TCP/IP for example.

According to the present invention, congestion management systems and methods are provided to overcome head-of-line blocking issues resulting from slower-speed network links, such as low speed WAN links or links using a TCP/IP based storage protocol. The flow-control congestion management systems and methods of the present invention advantageously prevent head-of-line blocking in each local SAN fabric. According to one aspect, such flow control mechanisms manage buffer and system level resources on a per-task basis. According to another aspect, such flow control mechanisms manage buffer and system level resources using a scheduler to control the amount of data requested from the local SAN fabric. Switches and other network devices configured according to the present invention monitor each individual SCSI task, and are capable of applying flow control measures to each active session when buffering resources become scarce, such as when buffering data for a slower-speed WAN link or TCP/IP based interconnects of any speed.

A congestion management system, or Congestion Manager, of the present invention is a valuable component of an integrated storage network that links local SAN fabrics (implemented with a link level flow control protocol) over a wide geographic distance. The Congestion Manager advantageously allows local SANs to function independently, without being adversely impacted by head-of-line blocking, for example, when they are connected to remote SAN fabrics using long-distance WAN links or TCP/IP. Switches configured with a Congestion Manager according to the present invention can use appropriate end-to-end flow control in an appropriate manner that minimizes disruption in the local high-performance SAN.

According to one aspect of the present invention, a method is provided for reducing network congestion. The method typically includes receiving a message by a network device coupling a high speed network link with a low speed or TCP/IP based network link, wherein the network device has a buffer memory, and wherein the message is sent from a requesting device to a destination device requesting that data be sent over the low speed or TCP/IP based link from the destination device to the requesting device. The method also typically includes determining whether the buffer memory has sufficient space to buffer the amount of data identified by the message request. If the buffer has sufficient space, the method typically includes transferring the message to the destination device and buffering the requested data received from the destination device in response to the message, wherein the requested data is sent over the low speed or TCP/IP based link destined for the requesting device. If the buffer doesn't have sufficient space, the method typically includes holding the message until the buffer has sufficient space.

According to another aspect of the present invention, a method is provided for reducing network congestion. The method typically includes monitoring operation requests received by a network device coupling one or more high speed network links with a low speed or TCP/IP based network link, wherein the network device has a buffer memory, and wherein the requests are sent between requesting devices and destination devices identifying data to be sent over the low speed or TCP/IP based link. For each received operation request, the method typically includes determining whether the buffer memory has sufficient space to buffer the amount of data identified by the request, and if so, transferring the operation request to the destination device and buffering the identified data received from the destination device, wherein the requested data is sent over the low speed or TCP/IP based link destined for the requesting device, and if not, holding the operation request until the buffer has sufficient space.

According to another aspect of the present invention, a method is provided for reducing network congestion. The method typically includes monitoring operation requests received by a network device coupling one or more high speed network links with a low speed or TCP/IP based network link, wherein the network device has a buffer memory, and wherein the requests are sent between requesting and destination devices identifying data to be sent over the low speed or TCP/IP based link. For each received operation request, the method typically includes controlling the rate at which the received operation requests are forwarded based on the amount of data to be returned. In one aspect, the received operation requests are forwarded by the network device such that the rate of requested data returned is substantially equal to the rate of the low speed or TCP/IP based network link. In certain aspects, forwarding of operation requests ceases temporarily when a threshold on the amount of available buffer memory remaining (e.g. 5%, 10%, 20%, etc.) in the network device is exceeded.

According to a further aspect of the present invention, a method is provided for enhancing write performance in a network including first and second switch devices coupled over a low speed or TCP/IP based network link, wherein the first switch device is coupled to an initiator device over a first high speed network link, and wherein the second switch device is coupled to a target device over a second high speed network link. The method typically includes automatically responding to a write request received by the first switch from the initiator with one or more ready-to-transfer messages on behalf of the target device, the ready-to-transfer messages requesting the write data from the initiator, and sending the write request to the target via the second switch device. The method also typically includes receiving the write data from the initiator, the write data being sent in response to the ready-to-transfer messages, and automatically sending the write data from the first switch to the second switch over the low speed or TCP/IP based network link so that the write data is stored on the second switch device. When the target sends one or more ready-to-transfer messages requesting all or a portion of the write data, the second switch is able to immediately respond with the requested amount of the stored write data.

According to yet a further aspect of the present invention, a method is provided for enhancing write performance in a network including first and second switch devices coupled over a first network link, wherein the first switch device is coupled to an initiator device over a second network link, and wherein the second switch device is coupled to a target device over a third network link, wherein the first network link has a high latency. The method typically includes automatically responding to a write request received by the first switch from the initiator with one or more transfer messages on behalf of the target device, the transfer messages requesting the write data from the initiator, and sending the write request to the target via the second switch device. The method also typically includes receiving the write data from the initiator, the write data being sent in response to the transfer message, and automatically sending the write data from the first switch to the second switch over the first network link so that the write data is stored on the second switch device. When the target sends one or more transfer messages requesting all or a portion of the write data, the second switch is able to immediately respond with the requested amount of the stored write data.

According to yet another aspect of the present invention, a network switch device is provided. The Switch typically includes a first port for coupling to a high speed network link, a second port for coupling to a low speed or TCP/IP based network link, a buffer memory, and a congestion management module executing on the switch device. The module is typically configured to monitor messages being sent between requesting and destination devices requesting that data be sent over the low speed or TCP/IP based link, and to determine, for each message, whether the buffer memory has sufficient space to buffer the amount of data identified by the message. If it is determined that there is sufficient space, the switch device transfers the message to the destination device and buffers the requested data received from the destination device in response to the message, wherein the requested data is sent over the low speed or TCP/IP based link destined for the requesting device, and if there is not sufficient space, the switch device holds the message until the buffer has sufficient space.

According to still a further aspect of the present invention, a control module executing on a network switch device is provided. The switch device typically includes a processor, a buffer, a first port for coupling to a low speed or TCP/IP based network link, and one or more second ports for coupling to one or more high speed network links. The module is typically configured with instructions to monitor messages being sent between requesting and destination devices requesting that data be sent over the low speed or TCP/IP based link, and to determine, for each message, whether the buffer memory has sufficient space to buffer the amount of data identified by the message. The module is also typically configured to control the switch device, if it is determined that there is sufficient space, to transfer the message to the destination device and buffer the requested data received from the destination device in response to the message, wherein the requested data is sent over the low speed or TCP/IP link destined for the requesting device, and if there is not sufficient space, to control the switch device to hold the message until the buffer has sufficient space.

According to still a further aspect of the present invention, a control module executing on a network switch device is provided. The switch device typically includes a processor, a buffer, a first port for coupling to a low speed or TCP/IP based network link, and one or more second ports for coupling to one or more high speed network links. The module is typically configured with instructions to monitor messages being sent between requesting and destination devices requesting that data be sent over the low speed or TCP/IP based link. The module is also typically configured to implement a rate limiting function to determine if a message should be forwarded to the destination device, wherein the module controls the switch device to transfer the message to the destination device and buffer the requested data received from the device in response to the transferred message if it is determined that a rate limit is not violated, wherein the requested data is sent over the low speed or TCP/IP link destined for the requesting device, and wherein the module controls the switch device to hold the message until the rate limit is no longer violated if sending the message would violate the rate limit.

According to still another aspect of the present invention, a write enhancement module executing on a network switch device is provided. The switch device typically includes a processor, a buffer, a first port for coupling to a low speed or high latency network link, and a second port for coupling to a high speed network link. The module is typically configured with instructions to control the switch to automatically respond to a write request received by the switch over the high speed network link from an initiator device with one or more transfer messages on behalf of the target device, the transfer messages requesting the write data from the initiator, and to send the write request to the target via a second switch device over the low speed or high latency network link. The module is also typically configured to control the switch to receive the write data from the initiator, said write data being sent in response to the transfer messages, and automatically send the write data to the second switch over the low speed or high latency network link so that the write data is stored on the second switch device, such that when the target sends one or more transfer messages requesting all or a portion of the write data, the second switch is able to immediately respond with the requested amount of the stored write data.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIG. 8 illustrates a sample user interface screen provided by software executing in a computer system coupled to a network according to one embodiment.

DETAILED DESCRIPTION OF THE INVENTION

A network device, such as a switch device or other device, is configured with a congestion management module ("Congestion Manager") according to one embodiment of the present invention. The Congestion Manager, in certain aspects, is configured to monitor traffic sessions flowing through the device and to implement resource management algorithms responsive to detected traffic. In certain aspects, the Congestion Manager monitors each SCSI task and implements an intelligent algorithm to ensure an optimal dynamic allocation of finite buffer resources to each task. For example, to overcome head-of-line blocking issues resulting from slower-speed links, such as low speed WAN links or TCP/IP based links, SCSI-level end-to-end flow control congestion management is provided by a Congestion Manager in a switch device to advantageously prevent head-of-line blocking in each local SAN fabric. Such flow control mechanisms manage buffer and system level resources on a per-task basis. Switches and other network devices configured with a Congestion Manager according to the present invention preferably monitor each individual SCSI task, and are capable of applying flow control measures to each active session when buffering resources become scarce, such as when buffering data for a slower-speed WAN link or TCP/IP based link.

Figure 1:
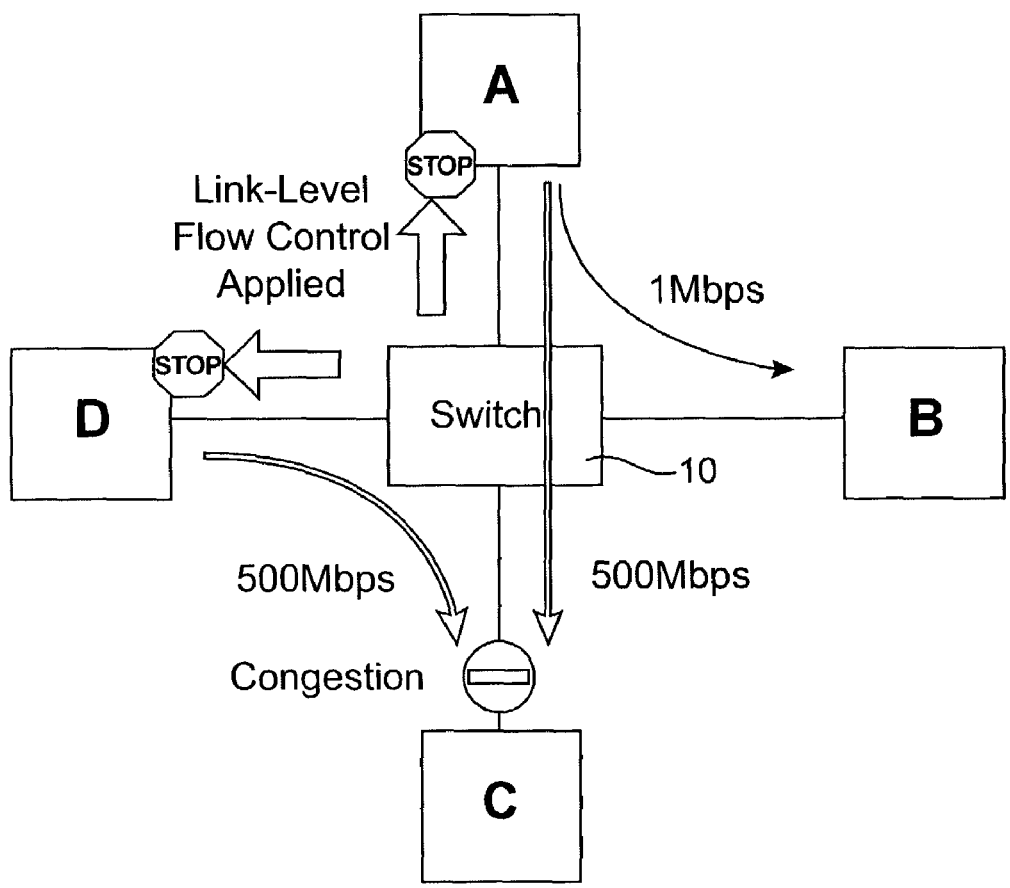
FIG. 1 illustrates how multiple sessions to Device C cause congestion, triggering link flow control to device A.
Figure 2:
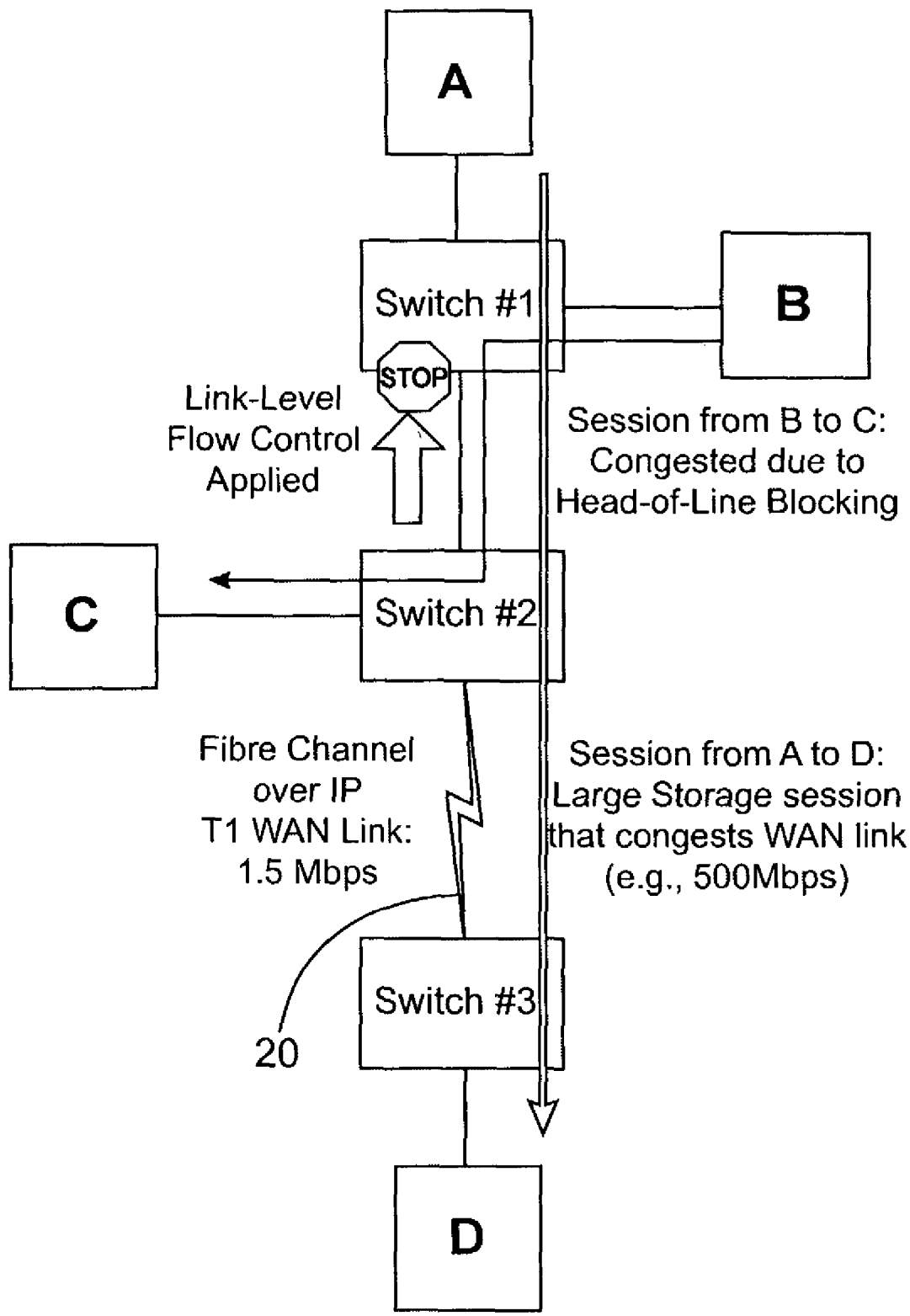
FIG. 2 illustrates how the introduction of slow-speed IP links, such as a T1 link, may have rippling effects on congestion.
Figure 3:
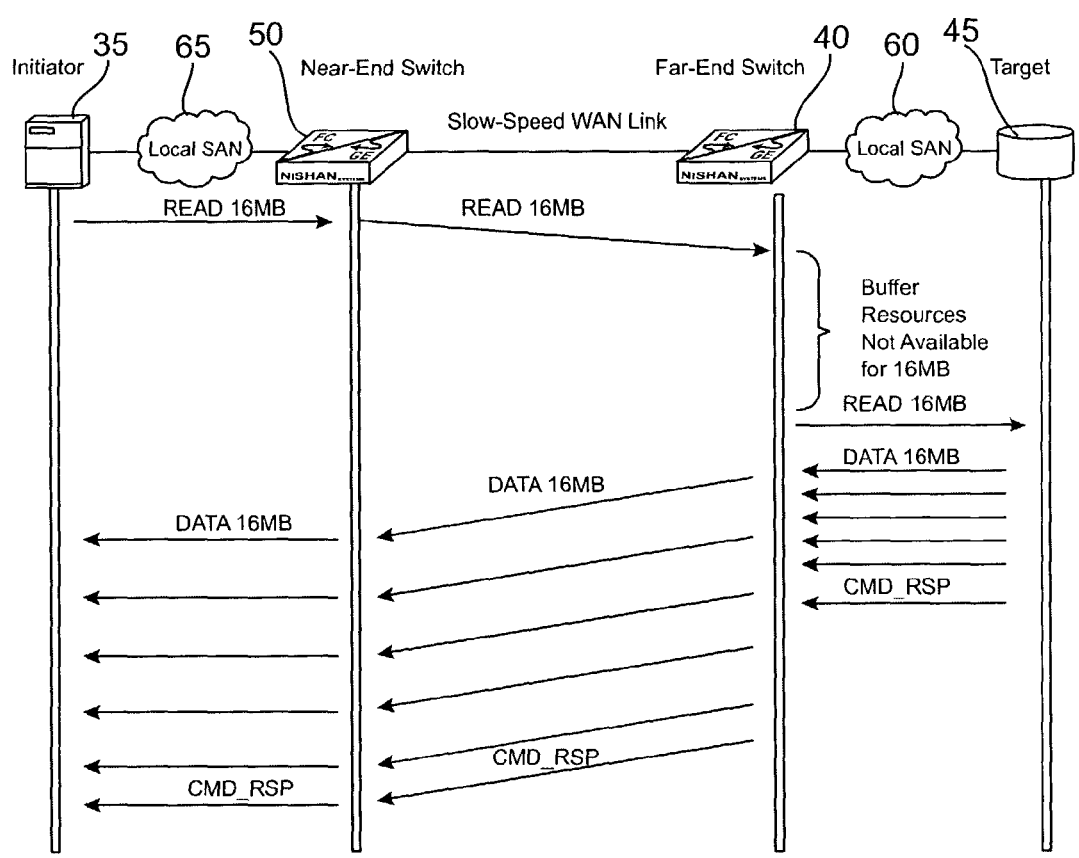
FIG. 3 illustrates end-to-end flow control applied to a read operation according to an embodiment of the present invention.

FIG. 3 illustrates flow control measures implemented by a Congestion Manager implemented in a switch device 40 according to one embodiment. When the Congestion Manager detects a command (e.g., either a read command or Ready-To-Transfer (RTT) message) for a SCSI operation that would consume excessive switch buffer resources, that command is held by the switch until sufficient buffer resources become available to receive the next complete data transfer segment for that command. This action serves to delay progress for that SCSI operation, providing time for resources on the switch to become available. If sufficient buffer resources are currently available, the command is not held. Once sufficient buffer resources are available, the command is released, allowing the SCSI operation to generate an amount of data that matches available resources.

As shown in FIG. 3, for example, when the Congestion Manager resident on switch 40 ("Far-End Switch" relative to initiator 35) detects a read command issued by initiator 35, the read operations are held until buffer resources on switch 40 are sufficient to receive all of the data requested from target 45 for the read command. For read commands, the Congestion Manager operates in the same manner regardless of whether the Fast Write capability (discussed below) is utilized or not. The switch 40 remote to the SCSI initiator 35 (closest to the target 45) monitors SCSI READ commands traveling to local targets. When switch 40 runs low on buffer resources needed to receive data from the target(s) for the next arriving SCSI READ command, the Congestion Manager instructs the switch 40 to hold the READ command and all others that follow until additional buffer resources become available. When additional buffer resources are freed, the READ command is released and allowed to travel to the target, causing the target to generate the READ data.

Figure 14:
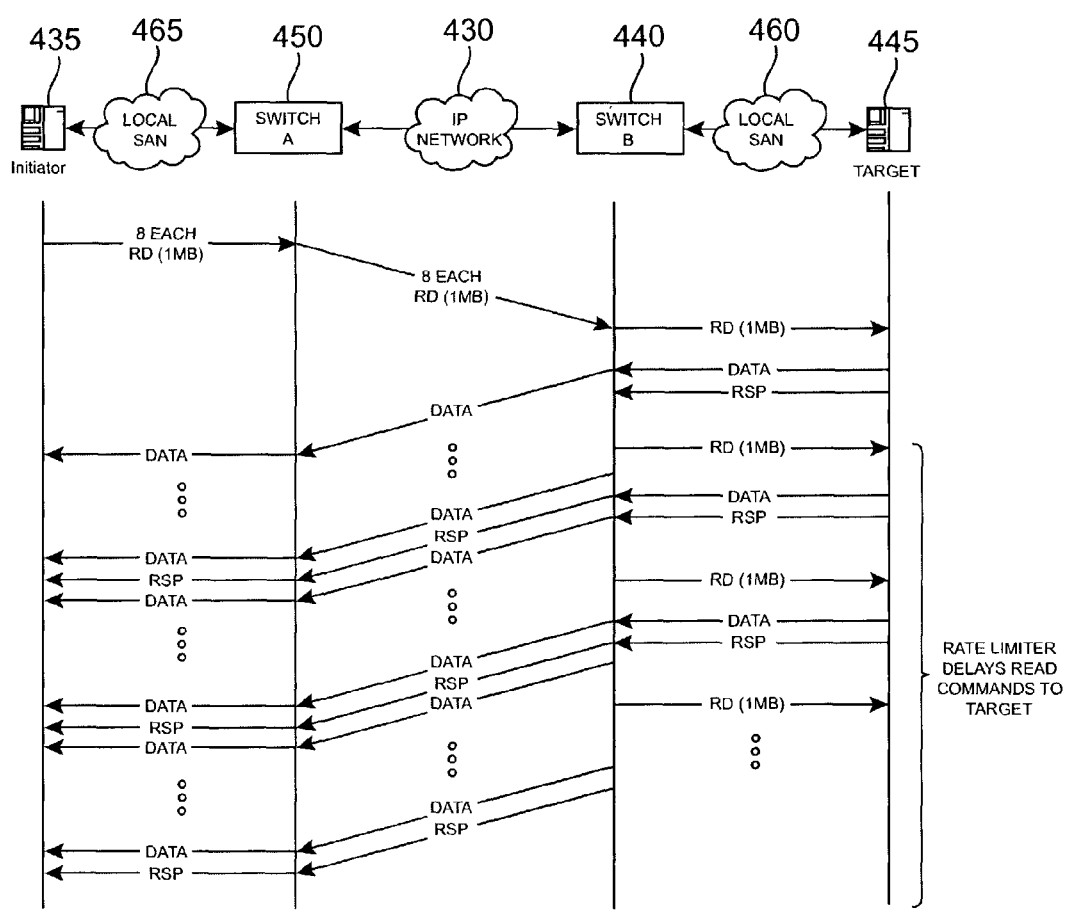
FIG. 14 shows an example use of a rate limiter module in a switch B to improve the congestion behavior of the local SAN.

In one embodiment, the Congestion Manager includes a rate limiter module configured to control the rate at which data requests are issued into a local SAN to aid in minimizing congestion. FIG. 14 shows an example use of a rate limiter module implemented in switch B 440 to improve the congestion behavior of the local SAN 460. In this example, assume that each local SAN 460 and 465 uses 1 Gbps links and the IP network 430 supports a data rate of 100 Mbps. The initiator 435 issues 8 read commands, each requesting 1 MB of data, which are transferred to Switch B. Switch B would normally immediately forward the individual commands onto the target. However, in one embodiment, the rate limiter module is configured to add delay between the commands to match the rate of the IP network. In this example, a 1 MB read request represents 8 Mbps of bandwidth or 80 ms of time on the 100 Mbps IP network, therefore, the rate limiter inserts 80 ms of time between the forwarded read requests in one embodiment. The use of a rate limiter advantageously makes the data traffic in the local SAN 460 less bursty. In the example of FIG. 14, the local SAN 460 would experience smaller bursts (1 MB) of traffic spaced at even intervals (80 ms) as opposed to a single large burst (8 MB).

In another embodiment, the rate limiter module is configured to add delay resulting in a data transfer rate to the network device from the target(s) that is less than or equal to the rate of the IP network. Alternately, or additionally, the rate limiter is configured in one embodiment to monitor the buffer resources on the network device, and if the amount of available memory resources currently available is less than a threshold amount (e.g., 5%, 10%, 20%, 30%, etc.) to temporarily hold the commands until sufficient memory resources become available.

Referring back to FIG. 3, without a Congestion Manager, SCSI operations would pass through the network device (e.g., switch 40) regardless of available resources to handle data generated by the operations. If the operations generated a greater amount of data than was available in the local device buffers, flow control would be applied at the link level, preventing upstream nodes (e.g., devices within local SAN 60, such as target 45, a storage device controller, switch device, etc.) from overflowing the available buffers. As a result of the link-level flow control, head-of-line blocking is a possibility for traffic utilizing the upstream device/node.

In addition, a Congestion Manager advantageously helps reduce I/O latency. Consider, for example, the case of the initiator 35 issuing both read and write commands. Without a Congestion Manager resident on switch 40, the read commands would be delayed behind the write data that is queued. If there is less write data queued, the read commands, when issued by the initiator, will propagate to the target with less delay. Likewise, the RTT issued by the target will also propagate more quickly to the initiator (or switch 50) when the amount of read data outstanding is limited.

In certain aspects, once buffer resources have been committed to a given SCSI operation, those resources are reserved for a finite period until either 1) data from that operation is received and the committed buffer resources are utilized, or 2) the finite period expires and the committed resources are reallocated to a different SCSI operation.

In certain aspects, the Congestion Manager is configured to monitor all active SCSI tasks and to allocate available buffer resources in a manner that ensures fairness among the active tasks. For example, if one particular SCSI task consumes a disproportionate amount of buffer space, then in order to ensure fairness, the Congestion Manager holds and delays the SCSI messages for that task in order to provide more buffer resources to other SCSI tasks. Within each SCSI task, SCSI messages are preferably held and released on a First-In-First-Out (FIFO) basis to prevent re-ordering of messages within the task.

In one embodiment, if the SCSI transport protocol used provides information that identifies the SCSI initiator device for each SCSI task, the Congestion Manager allocates resources fairly among all known SCSI initiator devices. According to one embodiment, for example, the Congestion manager includes a scheduling algorithm module configured to implement a scheduling algorithm, such as a weighted fair (equal) queuing algorithm, for allocating memory to outstanding tasks. Other scheduling algorithms may be used such as a round robin or strict priority algorithm.

In certain aspects, the Congestion Manager is configured to monitor different types of SCSI messages, depending on the direction of the operation. For example, in one embodiment, for read operations, the Congestion Manager monitors SCSI READ commands entering the locally-attached SAN fabric, and for write operations, the Congestion Manager monitors SCSI Ready-To-Transfer (RTT) messages leaving the locally-attached SAN fabric and entering the long distance WAN link.

Congestion Manager for Write Operations

The process to control the flow of write operations is similar to that described above for read operations, except the Congestion Manager monitors SCSI Ready-to-Transfer (RTT) messages. Because data flows in the opposite direction from read operations, the switch local to the SCSI initiator applies the flow control measures on the RTT messages. Thus, the Congestion Manager implemented in switch 50 of FIG. 3 monitors RTT messages entering local SAN 65 destined for an initiator device such as initiator 35, and applies the appropriate similar flow control measures as discussed above depending on the buffer resources available to switch 50.

In one embodiment, the mechanism for flow control for write operations differs depending on whether the Fast-Write mechanism (discussed below) is enabled or not. For the following, "Transparent Mode" refers to when Fast Write is disabled, since RTT messages are transparent between target and initiator, and "Non-Transparent Mode" refers to when Fast Write is enabled, since in this mode (as will be described) the initiator-side switch issues RTT messages on behalf of the target, in order to optimize SCSI performance in a high-latency environment.

Flow Control of Non-Transparent Write Operations (Fast Write Enabled)

Figure 4:
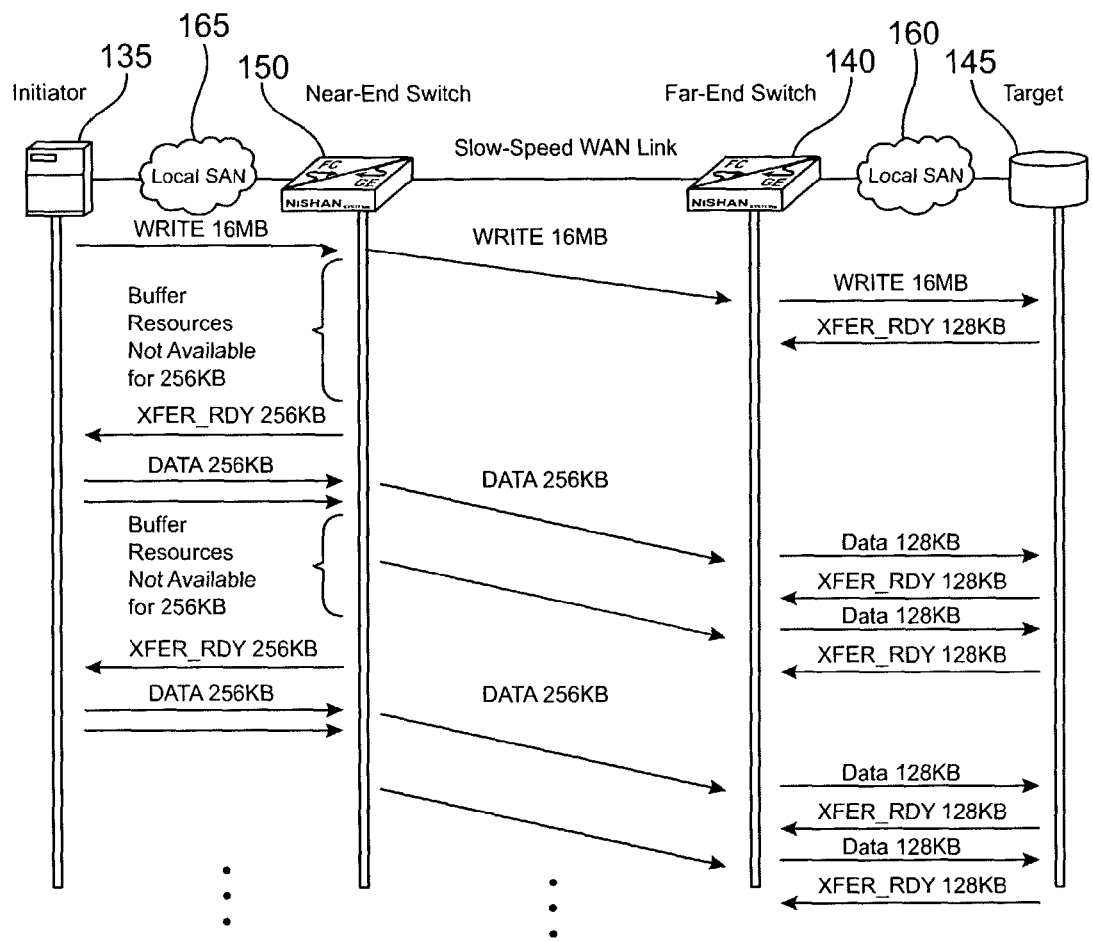
FIG. 4 illustrates flow control of write operations according to one embodiment of the present invention.

FIG. 4 illustrates Congestion Manager flow control using the Fast Write feature according to one embodiment of the present invention. As discussed below, the Fast Write feature advantageously provides the capability to minimize the effects of latency in long-distance SCSI data transfers. When using the Fast Write capability, switches issue SCSI Ready-to-Transfer (RTT) messages to the initiator on behalf of the target, in order to enhance performance by causing the initiator to "fill the pipe" with write data. Ready-to-Transfer messages are thus not transparent from target to initiator; RTT messages sent by the target are not the same as those received by the initiator.

As shown in FIG. 4, for example, when Fast Write is enabled, the initiator-side switch 150 would receive a write command from initiator 135 destined for target 145 and would normally immediately respond to the initiator with an RTT message requesting the write data for the entire write command. However, this could cause congestion and head-of-line blocking if the switch 150 lacked the resources to receive the entire write data. In one embodiment, with Congestion Manager enabled, the RTT message would not be issued until buffer resources for the entire Write operation, or a threshold amount, e.g., 256 KB, whichever is smaller, become available (note that 256 KB is an arbitrary buffer memory size, and other instantiations of the present invention may use other threshold trigger levels as required). If the original write operation transfers less than 256 KB of data, then the RTT is issued to the initiator when the buffer resources for the exact Write request size become available. If the original write operation transfers more than 256 KB of data, then a 256 KB RTT message is generated to affect a partial data transfer when 256 KB of buffer resources become available. Additional 256 KB RTT messages are then generated, as additional buffers become available, until all of the data from the original write operation is transferred.

In one embodiment, a rate limiter module, as described above, is implemented in switch 150 and operates in conjunction with the Fast Write module to add delay between the RTT messages so as to help minimize congestion in switch 150, for example by adding delay between the RTT messages sent to initiator 135 so that the write data sent by initiator responsive to the RTT messages is substantially equal to or less than the data transfer rate of the WAN link.

Flow Control of Transparent Write Operations (Fast Write Disabled)

Figure 5:
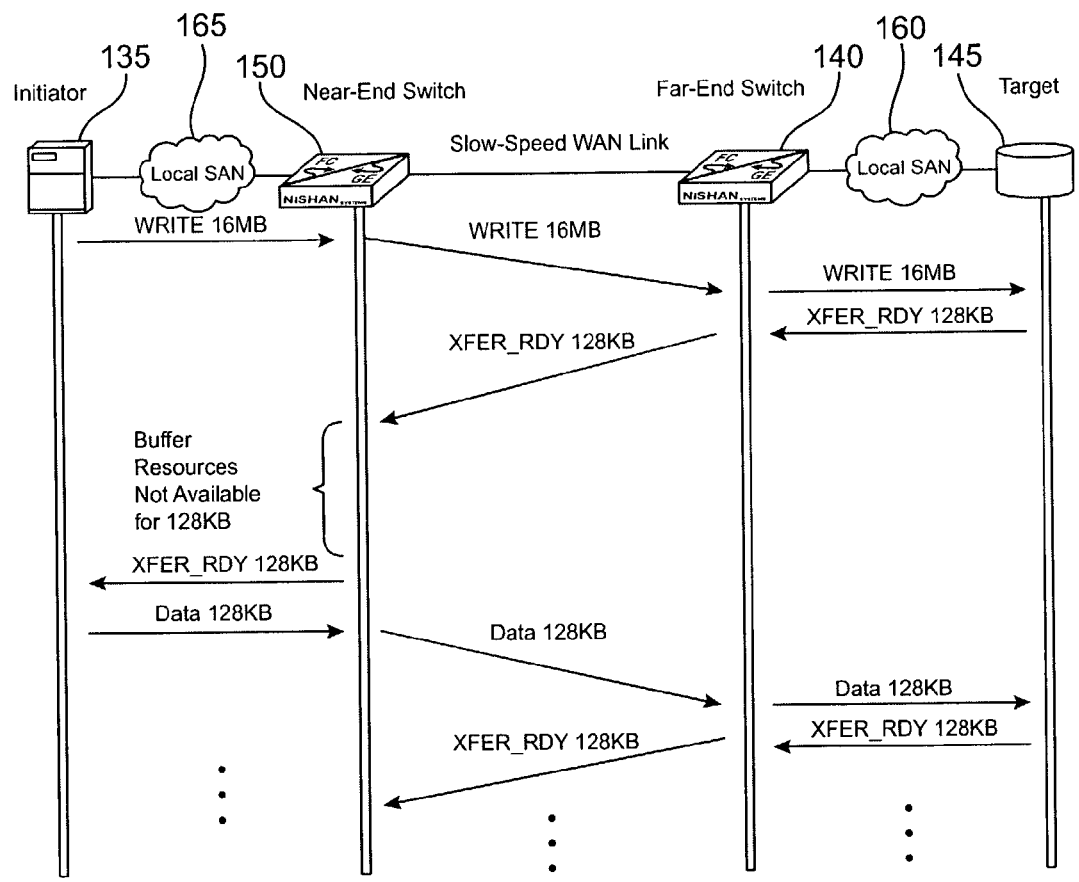
FIG. 5 illustrates an embodiment of the present invention with Fast Write disabled.

FIG. 5 illustrates a flow control process when the Fast Write feature is disabled. When Fast Write is disabled, RTT messages are passed transparently from target to initiator. In this case, the initiator-side switch 150 only needs to monitor RTT messages coming from the target 145 (or switch 140 in the configuration as shown). If the size of the RTT message is greater than the buffer resources switch 150 has available, then switch 150 holds the RTT message until buffer resources become sufficient to receive the entire write data specified by the RTT message. Any additional RTT messages that arrive at switch 150 from other initiators are similarly held and serviced as buffer resources become available.

In one embodiment, a rate limiter module, as described above, is implemented in switch 150. The rate limiter module operates to add delay between the RTT messages so as to help minimize congestion in switch 150, for example by adding delay between the RTT messages sent to initiator 135 so that the write data sent by initiator 135 responsive to the RTT messages is substantially equal to or less than the data transfer rate of the WAN link.

Fast-Write Software Feature

In one embodiment, a Fast-Write software feature useful in switches and other network devices is provided. The Fast-Write feature of the present invention significantly improves the performance of write operations between Fiber Channel initiators and targets on a wide area network. The actual improvement is dependent on several factors including Wide Area Network (WAN) Round Trip (RT) Time, available buffer on the target (i.e., size of the RTT message), number of concurrent SCSI tasks (e.g., I/O operations) supported by the application, number of concurrent RTT's supported by the target, and the application I/O size. As an example, test results comparing switches enabled with the Fast Write feature of the present invention to Fast-Write disabled switches have shown over a 10× performance improvement for write operations with a WAN delay of 40 ms, 740 KB I/O transactions, and 8 concurrent I/Os.

Example of Write Transaction without Fast Write

Figure 6:
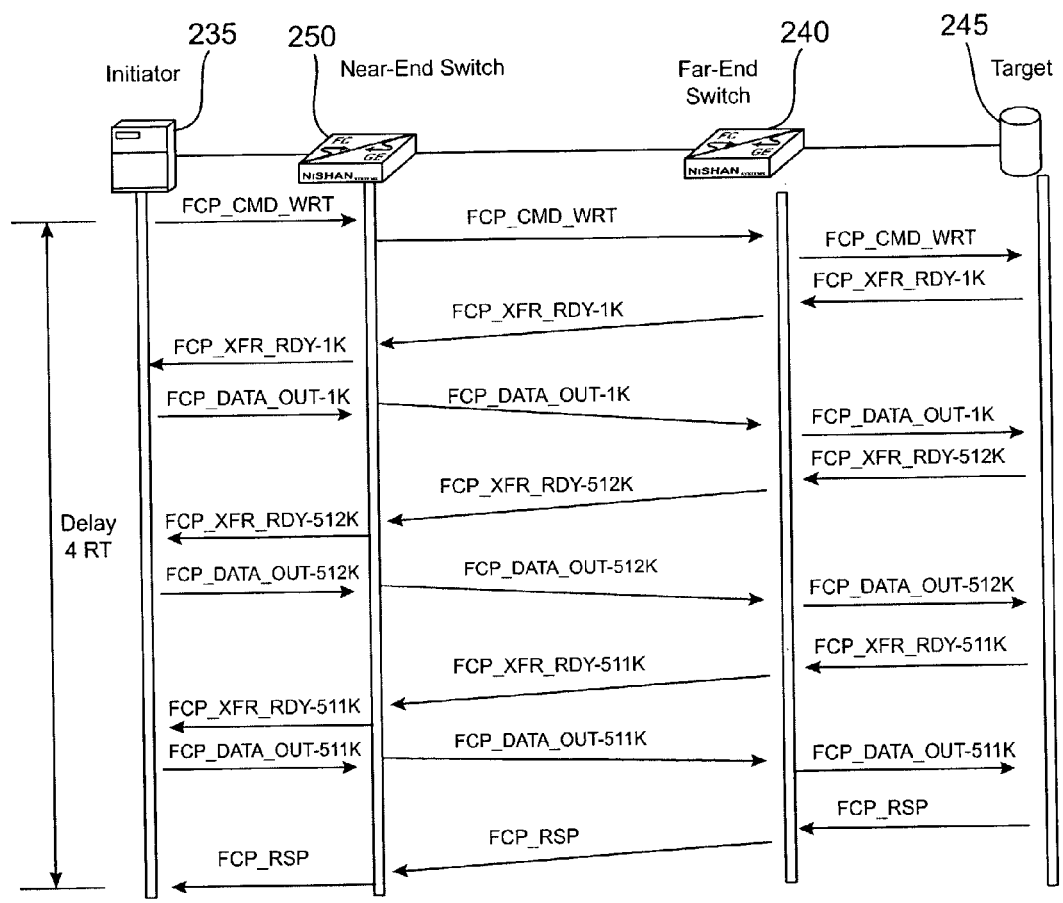
FIG. 6 shows a standard write transaction for a 1 MB write transaction.

FIG. 6 shows a standard 1 MB write transaction.

In the example of FIG. 6, the 1 MB write transaction begins with the SCSI initiator 235 initiating a SCSI Write Command for 1 MB block of data. The command reaches target 245 in T=0.5(RT)+2(local exchange times). Compared to the 0.5 (RT) component the local exchange time can be considered insignificant. The target 245 in this example has 1 KB of available buffer, and it responds with a Ready-To-Transfer (RTT) for 1 KB. The RTT is received in 0.5 (RT) by the SCSI initiator 235. The initiator 235 transmits 1 KB of data that is received by the target in 0.5 (RT). The target 245 then, in this example, has 512 KB of available buffer, and it issues a Ready-To-Transfer for 512 KB; which is received by the initiator in 0.5 (RT). The initiator 235 responds and 0.5 (RT) later the 512 KB block is written to the target 245. The process is repeated for the remaining 511 KB, and 0.5 (RT) later all the data is written to the target 245. The target 245 completes the successful operation by issuing a SCSI Response message (FCP_RSP) which is received by the initiator 235 0.5 (RT) later. The entire write operation required 4.0 (RT) or n+1 (RT) where n is the number of RTT issued by the target. In the example of FIG. 6, the RTT are represented by FCP_XFER_RDY.

Fast Write Enabled

Figure 7:
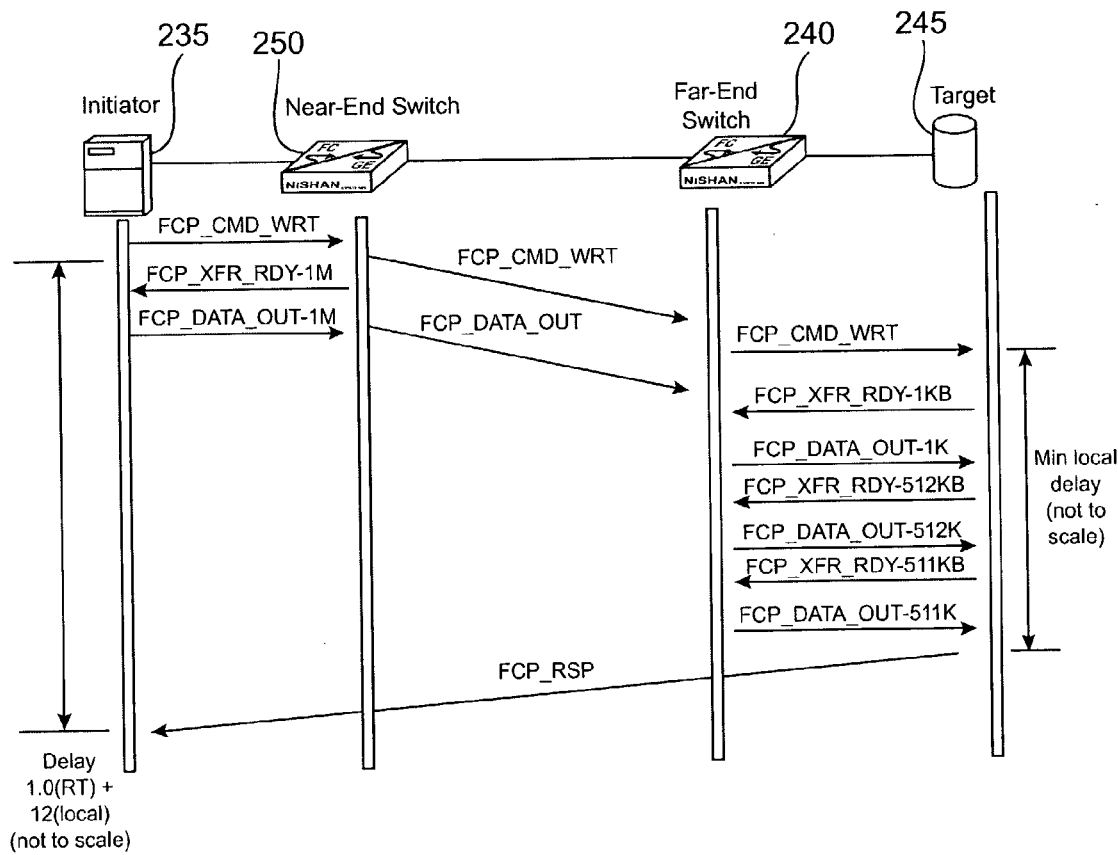
FIG. 7 illustrates a near-end switch operating in Fast Write mode according to one embodiment.
Figure 9:
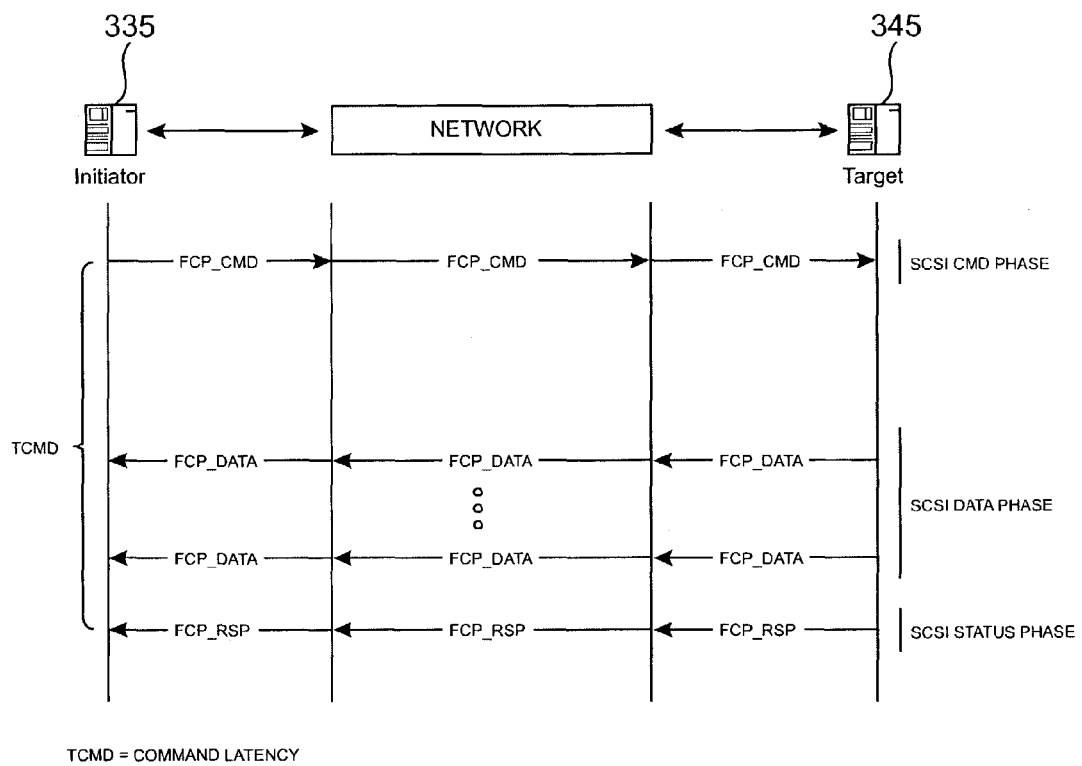
FIG. 9 shows an example of a SCSI read command using FCP (Fiber Channel Protocol) in a low latency network.
Figure 10:
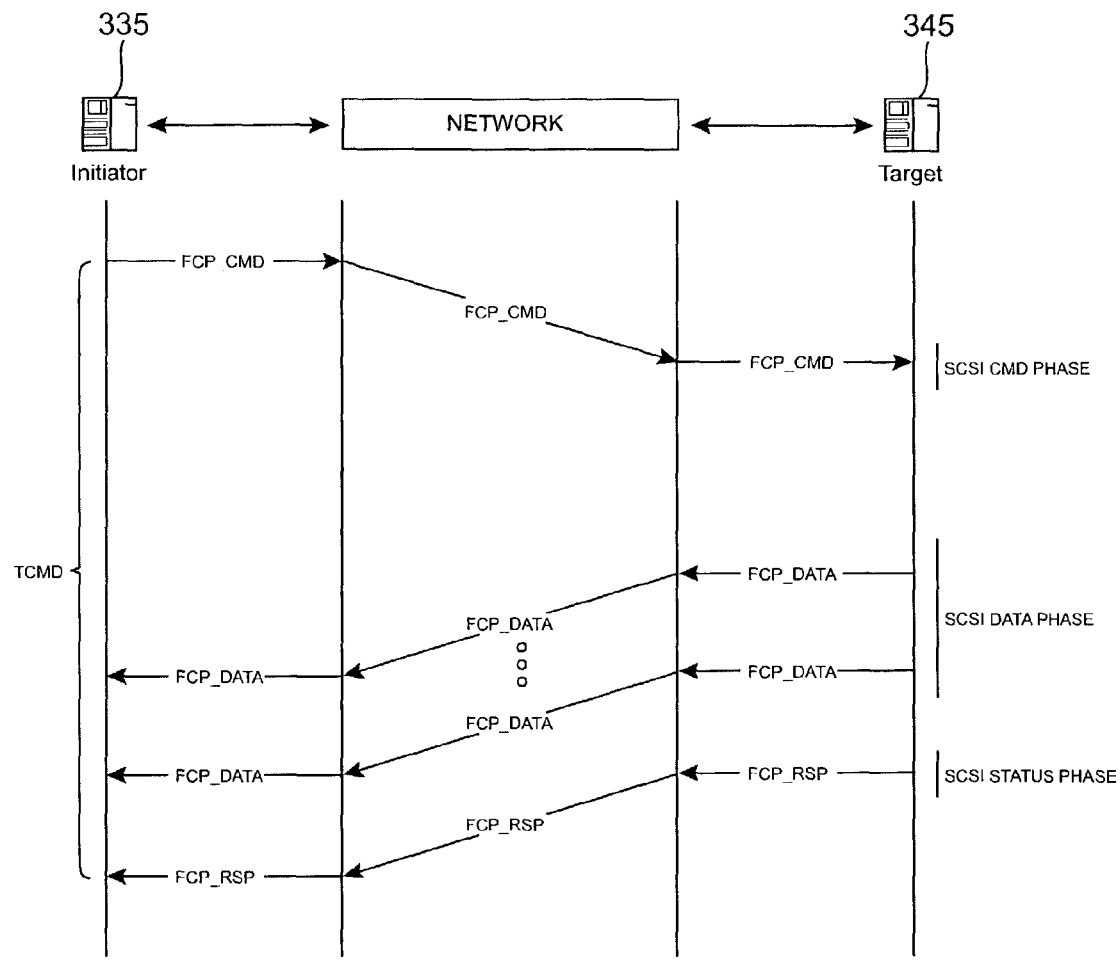
FIG. 10 shows how a read command is affected by network latency in a high latency network.
Figure 11:
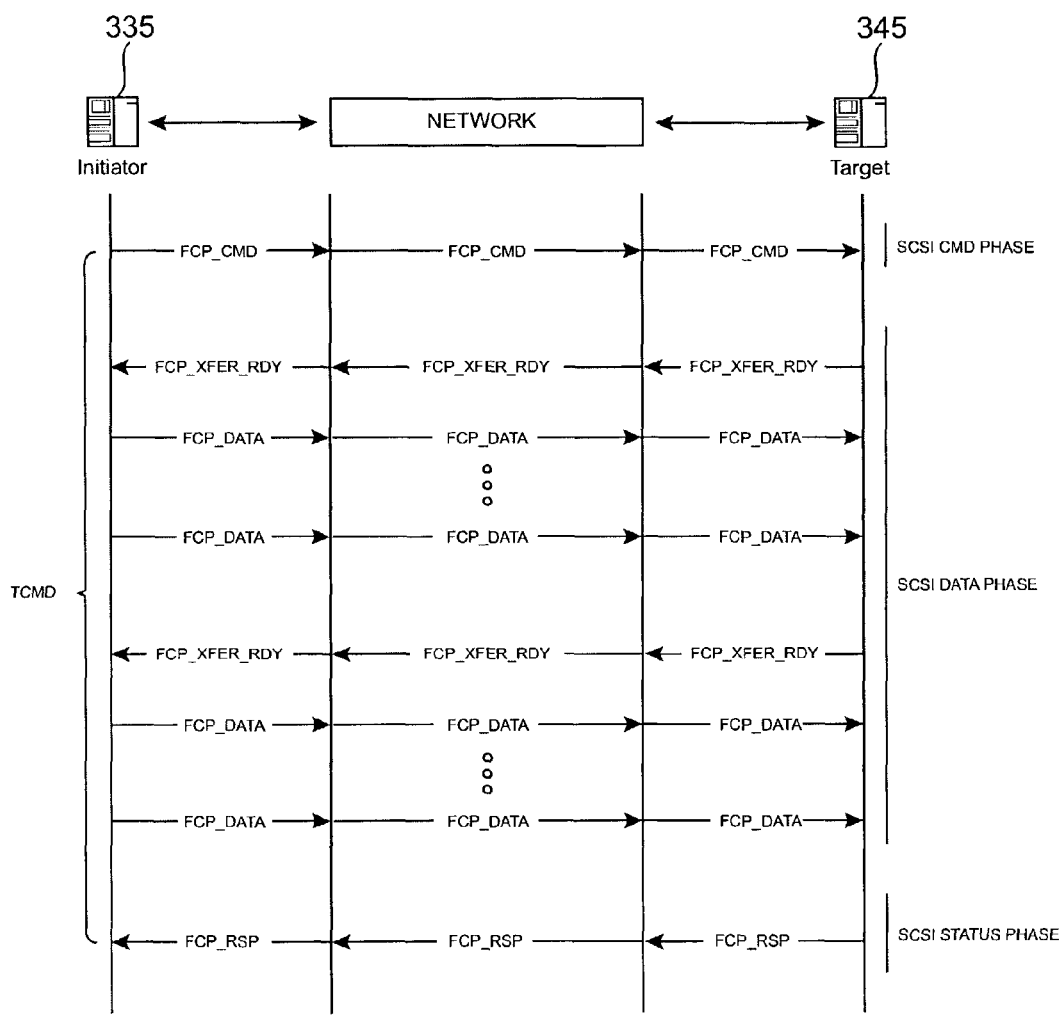
FIG. 11 shows an example of a SCSI write command performed using FCP in a low latency network.
Figure 12:
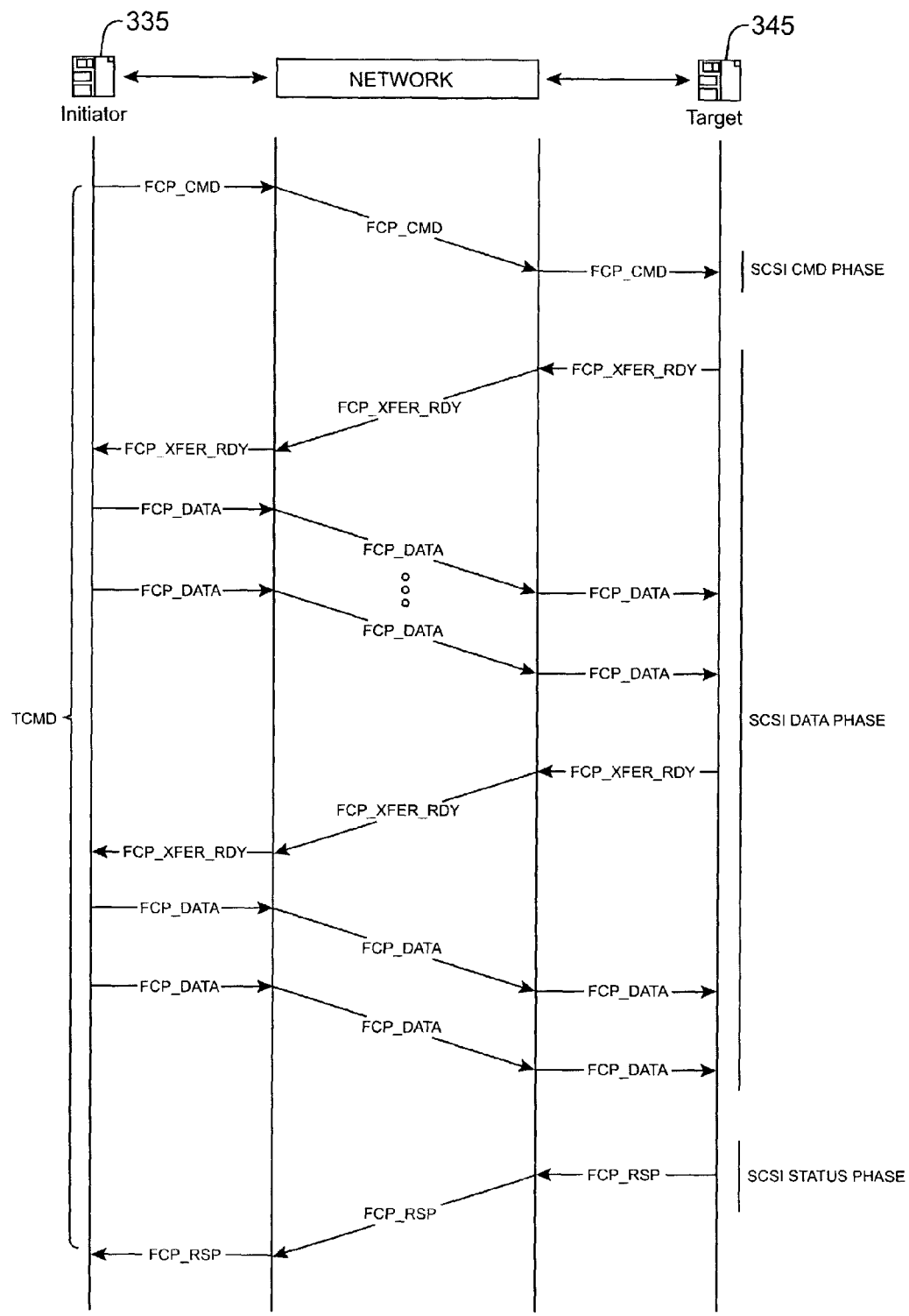
FIG. 12 shows the effect of performing write commands over a network with high latency.
Figure 13:
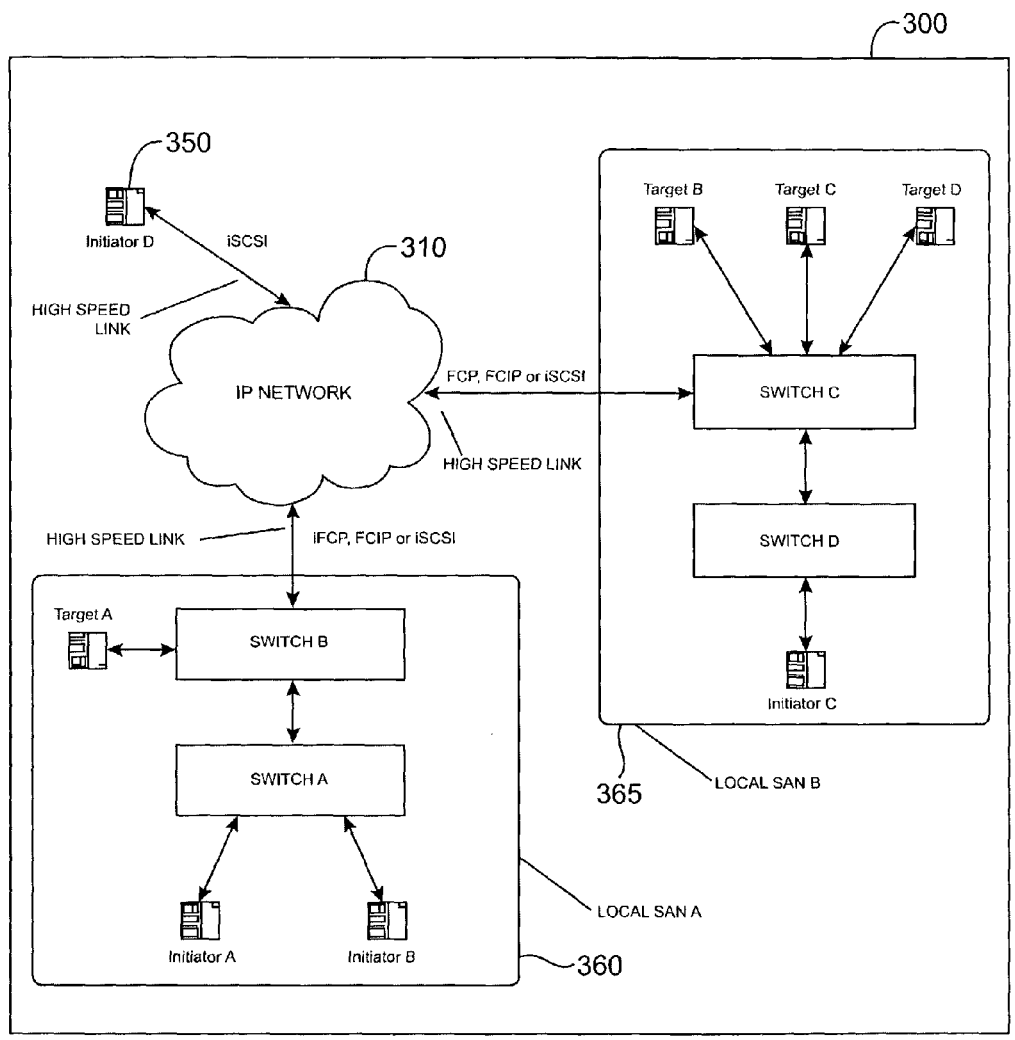
FIG. 13 shows a SAN which uses an IP network to interconnect Local SAN A, Local SAN B and an initiator device which uses iSCSI as the storage protocol.

When the near-end switch 250 (the switch connected to the SCSI initiator) is configured with the Fast Write feature and with Fast Write enabled, as shown in FIG. 7, the near-end switch 250 responds to the SCSI Write command received from initiator 235 with a Ready-To-Transfer message on behalf of the target 245. Instead of requesting 1 KB block of data, switch 250 requests that the entire 1 MB be transferred. Since there is not necessarily 1 MB of available buffer on the far-end target 245, the far-end switch 240 stores or caches the 1 MB of data. The Write command is forwarded to the target 245 where the target requests data, in this example 1 KB of data, be sent by issuing a Ready-To-Transfer message for 1 KB. The far-end switch 240, now storing the 1 MB of data, responds with 1 KB of data. The target 245 then requests 512 KB, and the far-end switch 240 responds with 512 KB of data; and so forth for the final 511 KB. The entire operation takes 1.0(RT)+12(local exchanges). Again, compared to the round trip time component the local exchanges are considered insignificant, and the net performance improvement is about 4× in this example.

In one embodiment, the Fast Write module of the present invention is implemented in software, executing on a device processor or a specialized processor module, and provides a graphical user interface (GUI). In preferred aspects, code for implementing the Fast Write is written in "C" but could be implemented in any language (e.g., assembly, Pascal, etc). FIG. 8 illustrates a sample screen provided by software executing in a computer system, such as a network management computer system, communicably coupled to the network. The GUI screen shown in FIG. 8 is that of a port configuration menu that allows a user, e.g., network administrator, to selectively optimize WAN throughput using the Fast Write capabilities of the present invention.

It should be appreciated that the Fast Write module of the present invention can be implemented in a specialized circuit assembly such as an FPGA or ASIC module including memory. It should also be appreciated that the entire congestion management functionality, including rate limiter features, although preferably implemented in software, can also be implemented partially or completely in an FPGA or ASIC module.

Fast Write Conclusion

The Fast-Write feature of the present invention advantageously (and significantly) improves the performance of write operations from SCSI initiators to SCSI targets. Improvements will be most significant for WAN links with significant delay, for small write operations, or when there are few concurrent I/Os. While the example above suggests a 4× performance improvement for write operations, improvements greater than 10× have been measured for a WAN link with a RT delay of 70 ms.

In certain preferred aspects, the Congestion Manager, rate limiter and Fast Write modules of the present invention are implemented in network switch devices. However, it should be understood that Congestion Manager and Fast Write modules as described herein can be implemented in any of a variety of other network devices, such as routers, controller cards, gateways, bridges, storage devices, etc. U.S. Pat. No. 6,400,730, which is hereby incorporated by reference in its entirety discloses useful network devices, including switch devices, in which modules of the present invention may be implemented.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of enhancing write performance in a network including first and second switch devices coupled over a high latency network link, wherein the first switch device is coupled to an initiator device over a first high speed network link, and wherein the second switch device is coupled to a target device over a second high speed network link, the method comprising:

responding to a write request received by the first switch device from the initiator device with a first ready-to-transfer (RTT) message on behalf of the target device, the first RTT message requesting write data from the initiator device;

receiving the write data from the initiator device at the first switch device, the write data being sent in response to the first RTT message; and sending the write data from the first switch device to the second switch device over the high latency network link, responsive to receipt of the write data from the initiator device and independent of receipt of a RTT message from the target device by the first switch device.

2. The method of claim 1, wherein the high latency network link comprises one or a plurality of network links.

3. The method of claim 1, wherein if the target device responds with a second RTT message requesting the write data before the write data has been forwarded from the first switch device, the second switch device forwards the requested write data to the target device when the requested write data is received from the first switch device.

4. The method of claim 1, wherein the write data sent from the first switch device to the second switch device is stored on the second switch device.

5. The method of claim 4, wherein, when the target device sends one or more RTT messages requesting at least a portion of the write data from the second switch device, the second switch device responds with the requested amount of stored write data.

6. A method of enhancing write performance in a network including first and second switch devices coupled over a first network link, wherein the first switch device is coupled to an initiator device over a second network link, and wherein the second switch device is coupled to a target device over a third network link, wherein the first network link has a slower data transfer rate than both the second and third network links, the method comprising:

responding to a write request received by the first switch device from the initiator device with a transfer message on behalf of the target device, the transfer message requesting write data from the initiator device;

receiving the write data from the initiator device at the first switch device, the write data being sent in response to the transfer message; and sending the write data from the first switch device to the second switch device, responsive to receipt of the write data from the initiator device and independent of receipt of a transfer message from the target device by the first switch device.

7. The method of claim 6, wherein the transfer message is a SCSI ready-to-transfer (RTT) message.

8. The method of claim 6, wherein the third network link is a storage area network (SAN).

9. The method of claim 6, wherein the third network link includes one or more Fiber Channel links.

10. The method of claim 6, wherein the first network link is a high latency network link.

11. The method of claim 6, wherein the second network link is one of a storage area network (SAN) and a local area network (LAN).

12. The method of claim 6, wherein the write data sent from the first switch device to the second switch device is stored on the second switch device.

13. The method of claim 12, wherein, when the target device sends one or more transfer messages requesting at least a portion of the write data from the second switch device, the second switch device responds with the requested amount of stored write data.

14. A write enhancement module executing on a network switch device, the network switch device including a first port for coupling to a low speed or TCP/IP based network link and a second port for coupling to a high speed network link, the write enhancement module being configured with instructions to control the network switch device to:
respond to a write request received by the network switch device via the second port over the high speed network link from an initiator device with a transfer message on behalf of a target device, the transfer message requesting write data from the initiator device, the target device being coupled to the low speed or TCP/IP based network link;
receive the write data from the initiator device, the write data being sent in response to the transfer message; and
send the write data to another network switch device via the first port over the low speed or TCP/IP based network link, responsive to receipt of the write data from the initiator device and independent of receipt of a transfer message from the second network switch device by the first network switch device.

15. The write enhancement module of claim 14, wherein the transfer message is a SCSI ready-to-transfer (RTT) message.

16. The write enhancement module of claim 14, wherein the write data sent from the first network switch device to the second network switch device is stored on the second network switch device.

17. The write enhancement module of claim 16, wherein, when the target device sends one or more transfer messages requesting at least a portion of the write data from the second switch device, the second switch device responds with the requested amount of stored write data.

18. A communications method for a network including first and second switch devices coupled over a high latency network link, wherein the first switch device is coupled to an initiator device over a first high speed network link and wherein the second switch device is coupled to a target device over a second high speed network link, the communications method comprising:
receiving at the first switch device a write request from the initiator device to write data to the target device;
requesting write data from the initiator device without requiring prior receipt of a transfer ready message by the first switch device, responsive to receipt of the write request by the first switch device;
receiving at the first switch device the write data from the initiator device, after requesting the write data;
sending the received write data from the first switch device to the second switch device via the high latency network link without requiring prior receipt of a transfer ready message from the target device by the first switch device.

19. The communications method of claim 18 wherein the operation of requesting write data from the initiator device is delayed until the first switch device has sufficient buffer memory available to buffer an amount of data indicated in the write request.

20. The communications method of claim 18 wherein the operation of requesting write data from the initiator device is delayed until the first switch device has sufficient buffer memory available to buffer a threshold amount of data.

21. The communications method of claim 18 wherein the transfer ready message includes a SCSI ready-to-transfer (RTT) message.

22. The communications method of claim 18 wherein the high latency network is a TCP/IP network.

23. The communications method of claim 18 wherein the high latency network is a wide area network.

24. A network switch device comprising:
a first port that couples to an initiator device via a high speed network link and receives a write request from the initiator device to write data to a target device;
a processor coupled to the first port that requests write data from the initiator device through the first port without requiring prior receipt of a transfer ready message by the network switch device;
a second port that couples to another network switch device via a low speed network link, wherein, responsive to the first port receiving the write data from the initiator device, the second port sends the received write data from the network switch device to the other switch device via the low speed network link without requiring prior receipt of a transfer message from the target device by the network switch device.

25. The network switch device of claim 24 wherein the processor delays requesting write data from the initiator device until the network switch device has sufficient buffer memory available to buffer an amount of data indicated in the write request.

26. The network switch device of claim 24 wherein the processor delays requesting write data from the initiator device until the network switch device has sufficient buffer memory available to buffer a threshold amount of data.

27. The network switch device of claim 24 wherein the transfer ready message includes a SCSI ready-to-transfer (RTT) message.

28. The network switch device of claim 24 wherein the low speed network is a TCP/IP network.

29. The network switch device of claim 24 wherein the low speed network is a wide area network.

* * * * *

UNITED STATES PATENT AND TRADEMARK OFFICE
CERTIFICATE OF CORRECTION

| | | |
|---|---|---|
| PATENT NO. | : 8,051,197 B2 | Page 1 of 1 |
| APPLICATION NO. | : 10/393957 | |
| DATED | : November 1, 2011 | |
| INVENTOR(S) | : Mullendore et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2554 days.

Signed and Sealed this
Thirty-first Day of January, 2012

David J. Kappos
*Director of the United States Patent and Trademark Office*